Patented June 16, 1936

2,044,603

UNITED STATES PATENT OFFICE 2,044,603

PROCESS OF MAKING HIGH VISCOSITY INDEX OILS

Harry T. Bennett, Tulsa, Okla., assignor to Mid-Continent Petroleum Corporation, Tulsa, Okla., a corporation of Delaware No Drawing. Application November 17, 1932, Serial No. 643,056

4 Claims. (Cl. 196—13)

This invention relates to processes of making high viscosity index oils. The invention herein disclosed is more broadly claimed in an application filed by me on March 2, 1931, Serial Number 519,698, and the present application is a continuation in part of said application Serial Number 519,698.

Specifically stated, the invention relates to a process of treating oils having high and low viscosity index constituents to effect a separation into fractions having a high viscosity index and a low viscosity index.

The viscosity index of an oil is a number indicating the extent to which its viscosity will change when the temperature is raised from 100° F. to 210° F. The viscosity of an oil having a low viscosity index will change very greatly in response to changes in temperature, while an oil having a high viscosity index will withstand such variations in temperatures without the same degree of change in viscosity.

Many hydrocarbon oils which have a relatively low viscosity index contain paraffinic and naphthenic constituents. The naphthenic constituents of an oil tend to give the oil a relatively low viscosity index and if they are removed from the oil, the remaining oil will have a substantially higher viscosity index.

An object of this invention, therefore, is to provide a simple and effective process of treating an oil with a selective solvent to remove the low viscosity index, or naphthenic, constituents.

Prior to my inventions, in this art when an oil, especially a heavy oil, was treated with a selective solvent to effect a separation of the oil into high and low viscosity index fractions, a considerable length of time was usually required to obtain the desired separation.

An important object of this invention, therefore, is to provide a process which will facilitate the action of a selective solvent during the treatment of an oil to quickly obtain a very sharp separation of the oil into high and low viscosity index fractions.

In the preferred form of this invention, a diluent and a selective solvent are mixed with the oil to be treated. The resultant product may then be readily separated into fractions of relatively high and low viscosity indices.

The diluent is preferably a hydrocarbon oil having a boiling point from 95° F. to 350° F., such as pentane, which is a pure hydrocarbon having a boiling point of about 96° F. As a further illustration of diluents that may be used, I will refer to a hydrocarbon mixture having an initial boiling point of about 95° F. and an end point of about 350° F., such as gasoline.

The quantity of diluent used will vary with the nature of the oil to be treated. The amount, however, will usually be from about ten to about thirty-five percent. of the mixture of oil and diluent.

The solvent used in this process may be any solvent which has a selective action for either the high or low viscosity index constituents of the oil. I have found that a halogenated ether, such as dichlorethyl ether, will give excellent results.

After the diluent and solvent have been mixed with the oil, the resultant product may be quickly separated into fractions having high and low viscosity indices in any suitable manner, such as by allowing said product to settle.

The diluent and solvent may be readily separated from the oil by distillation, or by any other suitable methods.

As a specific illustration of one form of this invention, I will state that a Mid-Continent lubricating oil stock having a Saybolt Universal viscosity of 154 at 210° F. and a viscosity index of 67 may be treated in accordance with my invention as follows:

About one part of gasoline (boiling range 116° to 249° F.) and twelve parts of beta beta' dichlorethyl ether may be added to three parts of said oil.

This mixture may be agitated at a temperature of about 110° F. to dissolve the low viscosity index constituents in the solvent. The resultant product is then allowed to settle into layers. The relatively heavy lower layer will contain the dissolved naphthenic or low viscosity index constituents, while the lighter upper layer will contain paraffinic or high viscosity index constituents.

The gasoline and dichlorethyl ether may then be removed from the oil fractions by separately distilling the same.

The paraffinic fraction, which was about 52 percent. of the original oil, will have a viscosity index of about 90. The naphthenic fraction will have a viscosity index of about 20.

In the process herein disclosed, the diluent will facilitate the mixing of the solvent with the oil, and it permits a very sharp and rapid separation of the oil into the desired high and low viscosity index fractions.

I claim:

1. In the art of making high viscosity index lubricating oils, the process of treating an oil having high and low viscosity index constituents, which comprises mixing said oil with a diluent and chlorinated ether to dissolve low viscosity index constituents of the diluted oil in the chlorinated ether, separating the mixture into a high viscosity index oil fraction and a low viscosity index chlorinated ether solution, and removing chlorinated ether from the separated constituents to produce a lubricating oil having a higher viscosity index than the original oil and a residual oil having a lower viscosity index.

2. In the art of making high viscosity index lubricating oils, the process of treating an oil having high and low viscosity index constituents, which comprises mixing said oil with dichlorethyl ether and a hydrocarbon liquid having a boiling point between about 95° F. and 350° F. to freely dissolve low viscosity index constituents of the diluted oil in the dichlorethyl ether, separating the mixture into a relatively light high viscosity index oil fraction and a heavier low viscosity index dichlorethyl ether solution, and removing dichlorethyl ether from the separated constituents to produce a lubricating oil having a higher viscosity index than the original oil and a residual oil having a lower viscosity index.

3. In the art of making high viscosity index lubricating oils, the process of treating an oil having high and low viscosity index constituents, which comprises mixing said oil with pentane and dichlorethyl ether to dissolve low viscosity index constituents of the diluted oil in the dichlorethyl ether, separating the mixture into a high viscosity index oil fraction and a low viscosity index dichlorethyl ether solution, and removing dichlorethyl ether and pentane from the separated constituents to produce a lubricating oil having a higher viscosity index than the original oil and a residual oil having a lower viscosity index.

4. In the art of making high viscosity index lubricating oils, the process of treating an oil having high and low viscosity index constituents, which comprises mixing said oil with a diluent and beta beta' dichlorethyl ether to dissolve low viscosity index constituents of the diluted oil in the beta beta' dichlorethyl ether, separating the mixture into a high viscosity index oil fraction and a low viscosity index dichlorethyl ether solution, and thereafter removing dichlorethyl ether from the high viscosity index fraction to produce a lubricating oil having a higher viscosity index than the original oil.

HARRY T. BENNETT.